Dec. 27, 1927.

K. C. RANDALL

CIRCUIT INTERRUPTER

Filed April 18, 1922

1,654,309

WITNESSES:
O. N. Cochran
A. W. Martin

INVENTOR
Karl C. Randall.
BY
Wesley G. Carr
ATTORNEY

Patented Dec. 27, 1927.

1,654,309

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

Application filed April 18, 1922. Serial No. 555,183.

My invention relates to circuit interrupters and particularly to interrupters that are governed by conditions in the circuit which it is desired to control.

Heretofore, it has been proposed, in low-voltage tripping devices, to hold a circuit breaker closed against the tension of a spring by means of an electromagnet. In these devices, when the current through the magnet falls below a predetermined value, the interrupter is biased to open position by means of the spring. However, in some forms of apparatus, it is not desirable to have the interrupter opened under only slight reductions in voltage or when such reductions in voltage are of only momentary duration.

My invention has for its object the provision of means for maintaining the effective holding force of a closing coil substantially constant throughout a comparatively wide range of current values and for a substantial period of time after the occurrence of a relatively great change in current value.

A further object of my invention is to simplify and improve generally the operation of circuit interrupters of the low-voltage type.

Figure 1:
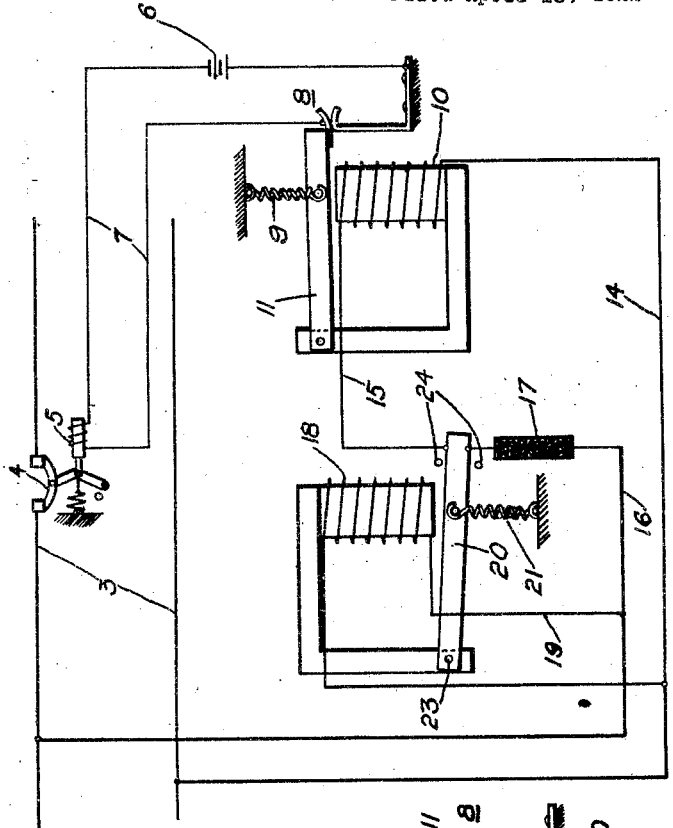
Figure 2:
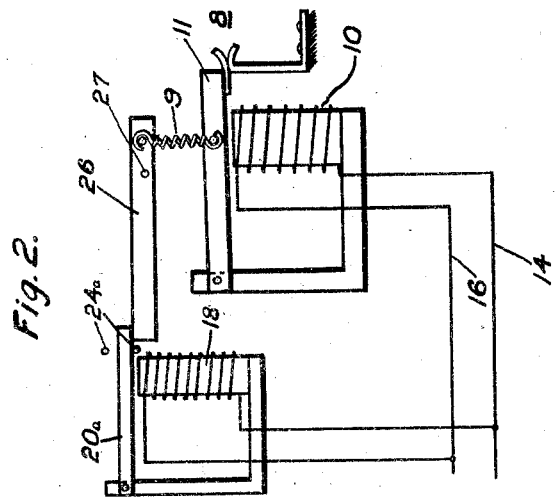

As shown in the accompanying drawings, Figure 1 is a diagrammatic view of one form of my invention, and Fig. 2 is a similar view of a modified form thereof.

For the purpose of illustrating my invention, I have shown a main circuit 3 that is provided with a circuit breaker 4 which is normally held in closed position by a closing coil 5 that is energized by a battery or other source of current 6 through a circuit 7.

A switch 8 controls the auxiliary circuit 7 and this switch is actuated by means of a tension spring 9 that normally tends to bias it to open position and by an electromagnet 10 which, when energized, opposes the force of the spring 9 and tends to maintain the switch 8 in closed position, through its pivoted armature 11.

The electromagnet 10 is connected across the main circuit 3 through lines 14, 15 and 16. A variable resistor 17, which may be a carbon pile, connects the lines 15 and 16.

When normal voltage is impressed on the main circuit 3, the magnet 10 is sufficiently energized to attract the armature 11 against the tension of the spring 9, thereby closing the auxiliary circuit 7 and causing energization of the holding coil 5 that maintains the main circuit 3 closed.

A second electromagnet 18 is also connected across the main circuit 3, through a shunt circuit 19, and normally serves to attract an armature 20 against the tension of a spring 21.

The armature 20 is pivoted at 23 and has its range of movement limited by stop members 24.

Should the voltage in the circuit 3 fall below a predetermined value, the holding force of the magnets 10 and 18 would ordinarily be correspondingly decreased, thus tending, in the case of the magnet 10, to permit the spring 9 to open the switch 8. However, upon the occurrence of a decrease in the voltage, the spring 21 moves the armature 20 downwardly, compressing the carbon pile 17 and thereby decreasing the resistance to a flow of current through the magnet 10. This decrease in resistance compensates for the decrease in voltage in the main circuit 3 and causes the holding forces of the magnet 10 to remain substantially constant.

Should the voltage of the main circuit 3 fall to a point below a predetermined value, the holding force of the magnet 18 would be sufficiently decreased to cause the armatur 20 to be moved by the spring 21 to its limit of movement, thereby reaching a point where the resistance through the device 17 could not be further decreased. Consequently, there would be no further compensation for the decrease in the current through the magnet 10 and the spring 9 would open the switch 8.

As shown in Fig. 2, the magnet 10 is connected across the main circuit in the manner above described, but there is no resistor in series with such magnet. The upper end of the spring 9 is connected to a lever 26 that is pivoted at 27. The magnet 18 is provided with an armature 20a that operates between stops 24a and energizes one end of the lever 26.

It will be seen that, when the voltage of the main circuit decreases, the holding forces of the magnets 10 and 18 will also be decreased, but it will be seen that the force exerted by the armature 20a upon the one end of the lever 26 is correspondingly decreased and that the tendency of such lever, through the spring 9, to raise the armature 11 is decreased.

The magnets 10 and 18 exercise opposing forces, and, as the force exerted by the magnet 18 decreases, through a reduction in the voltage of the main circuit, the decrease in the holding forces exerted by the magnet 10 will be neutralized, until the armature 20a has moved to its upward limit against the upper stop member 24a after which a further decrease in the voltage of the main circuit will so reduce the holding force of the magnet 10 that the spring 9 will open the switch 8.

In addition to providing for a range of fluctuations within which the effective holding force of the magnet 10 is maintained, it will be seen that, owing to the mechanical arrangement of moving parts, such momentary fluctuations of the voltage of the main circuit will not cause the auxiliary circuit to be broken.

By changing the positions of the stop members 24 and providing a resistor 17 having the required amount of flexibility, it is possible to vary the range of fluctuation within which it is not desired to have the circuit breaker 4 opened.

Various modifications in detail and general arrangement may be made without departing from the spirit and scope of the invention, as defined in the appended claims.

I claim as my invention:

1. The combination with a main circuit and an interrupter therefor, of an auxiliary circuit for holding the interrupter closed, a switch for the auxiliary circuit, a spring for biasing the switch to open position, an electromagnet connected across the main circuit and normally holding the switch closed, a second magnet also connected across the main circuit, an armature for the second magnet, a spring for biasing the armature away from its magnet, and means whereby upon a decrease in voltage of the main circuit, the resulting movement of the armature by its spring prevents a corresponding decrease in the effective holding force of the electromagnet.

2. The combination with a main circuit and and interrupter therefor, of an auxiliary circuit for holding the interrupter closed, a switch for the auxiliary circuit, a spring for biasing the switch to open position, an electromagnet connected across the main circuit and normally holding the switch closed, a resistance in series with the electromagnet, a second magnet also connected across the main circuit, an armature for the second magnet, a spring for biasing the armature away from its magnet, and means whereby upon a decrease in voltage of the main circuit, the resulting movement of the armature by its spring effects a decrease in the said resistance.

3. The combination with a main circuit and a controlling device therefor, of an auxiliary circuit for actuating the controlling device, an interrupter for the auxiliary circuit, magnetically-actuated means controlled by conditions in the main circuit for actuating the interrupter, and means for automatically maintaining the magnetic force of the said means substantially constant over a predetermined range of voltage fluctuations in the main circuit.

4. The combination with a main circuit and a controlling device therefor, of an auxiliary circuit for actuating the controlling device, an interrupter for the auxiliary circuit, magnetically-actuated means controlled by conditions in the main circuit for actuating the interrupter, and means also controlled by conditions in the main circuit for automatically maintaining the magnetic force of the said means substantially constant over a predetermined range of voltage fluctuations in the main circuit.

5. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means for automatically maintaining the effective holding force of the said magnet constant over a predetermined range of fluctuation in the voltage of the main circuit.

6. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means controlled by conditions in the main circuit for automatically maintaining the effective holding force of the said magnet constant over a predetermined range of fluctuation in the voltage of the main circuit.

7. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means controlled by conditions in the main circuit for retarding the operation of the said magnet.

8. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means for compensating for a decrease in current value in the said magnet, to prevent actuation of the said interrupter within predetermined limits.

9. The combination with a circuit interrupter, of an actuating means therefor responsive to current in the circuit, and means for maintaining the voltage of the current supplied to the actuating means substantially constant within a predetermined range of voltage fluctuations of the circuit whereby operation of the actuating means is prevented within predetermined limits of voltage fluctuations.

10. The combination with a circuit interrupter, of an actuating means therefor responsive to current in the circuit, and means for maintaining the voltage of the current supplied to the actuating means substantially constant within a predetermined range of voltage fluctuations of the circuit whereby operation of the actuating means is prevented until an abnormal condition in the circuit has obtained for a substantial period of time.

11. The combination with a circuit interrupter, of an actuating means therefor responsive to current in the circuit, and means for maintaining the voltage of the current supplied to the actuating means substantially constant within a predetermined range of voltage fluctuations of the circuit whereby operation of the actuating means is prevented until an abnormal condition in the circuit has obtained for a substantial period of time and within a predetermined range of fluctuations in value by the said voltage.

12. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means comprising a second electromagnet controlled by conditions in the main circuit for automatically maintaining the effective holding force of the said magnet constant over a predetermined range of fluctuation in the voltage of the main circuit.

13. The combination with a main circuit and a controlling device therefor, of an auxiliary circuit for actuating the controlling device, an interrupter for the auxiliary circuit, means for biasing the interrupter to open position, an electromagnet connected across the main circuit for holding the interrupter closed, and means comprising a second electromagnet for compensating for a decrease in current value in the said magnet, to prevent actuation of the said interrupter within predetermined limits.

In testimony whereof, I have hereunto subscribed my name this 17th day of April 1922.

KARL C. RANDALL.